US005665320A

United States Patent [19]

Ogoshi

[11] Patent Number: 5,665,320

[45] Date of Patent: Sep. 9, 1997

[54] DECOMPOSITION METHOD FOR HALOGENATED COMPOUND AND DECOMPOSITION APPARATUS THEREFOR

[76] Inventor: Makoto Ogoshi, 3-8, Tanoura 1-chome, Moji-ku, Kitakyushu-shi, Fukuoka-ken, Japan

[21] Appl. No.: 970,860

[22] Filed: Nov. 3, 1992

[30] Foreign Application Priority Data

Jun. 27, 1992 [JP] Japan .................................... 4-193013

[51] Int. Cl.[6] ................................................ B01J 19/12

[52] U.S. Cl. ........................................ 422/186.3; 422/186

[58] Field of Search ................................ 422/186.3, 186; 204/157.2, 157.44, 157.63

[56] References Cited

U.S. PATENT DOCUMENTS

| | | | |
|---|---|---|---|
| 1,969,655 | 8/1934 | Mailey | 23/252 |
| 2,728,859 | 12/1955 | Gochenour et al. | 250/49 |
| 2,935,611 | 5/1960 | Myers | 250/49 |
| 3,138,708 | 6/1964 | Ellner et al. | 250/46 |
| 3,174,819 | 3/1965 | Clayton | 21/78 |
| 4,045,316 | 8/1977 | Legan | 204/158 R |
| 4,141,830 | 2/1979 | Last | 210/63 Z |
| 4,179,616 | 12/1979 | Coviello et al. | 250/527 |
| 4,189,363 | 2/1980 | Beitzel | 204/157.1 R |
| 4,563,286 | 1/1986 | Johnson et al. | 210/721 |
| 4,874,489 | 10/1989 | Callerame | 204/157.44 |
| 5,126,111 | 6/1992 | Al-Ekabi et al. | 422/186.3 |
| 5,266,215 | 11/1993 | Engelhard | 210/748 |

FOREIGN PATENT DOCUMENTS

| | | |
|---|---|---|
| 49-82570 | 11/1974 | Japan . |
| 50-63005 | 6/1975 | Japan . |
| 5639290 | 2/1977 | Japan . |
| 61-59779 | 10/1986 | Japan . |
| 1205510 | 3/1989 | Japan . |
| 2241586 | 4/1990 | Japan . |

OTHER PUBLICATIONS

Chemistry—A Conceptual Approach, 2nd Ed., Charles E. Mortimer, pp. 256–258.

*Primary Examiner*—Peter A. Nelson
*Assistant Examiner*—Daniel Jenkins
*Attorney, Agent, or Firm*—Lane, Aitken & McCann

[57] ABSTRACT

The present invention provides a decomposition method for a halogenated compound which can decompose a halogenated compound by a simple equipment and with high decomposition rate in an extremely short period of time and which can save energy and is excellent in operability, workability and safety.

According to the decomposition method for a halogenated compound of the present invention, a halogenated compound or a halogenated compound containing fluid are mixed with an ozone containing fluid, and a ray of light having a wavelength of 250 nm to 650 nm is irradiated under the turbulent flow or emulsified state and under the temperature condition from normal temperature to 200° C.

1 Claim, 3 Drawing Sheets

PCB
7a
11
Water
7
12
13
1
15
14
16
10
$O_3$
9
8
$O_2$ 15
16
14
1
13
12
11
Water
PCB
7a
7
$O_3$
10
9
8
$O_2$

DECOMPOSITION METHOD FOR HALOGENATED COMPOUND AND DECOMPOSITION APPARATUS THEREFOR

BACKGROUND OF THE INVENTION

1. Field of the Invention

The present invention relates to a decomposition method for suitable for decomposition of a halogenated compound, and particularly suitable for a polyhalogenated compount such as PCB, and a decomposition apparatus therefor.

2. Description of the Related Art

Polyhalogenated biphenyl, particularly PCB is excellent in heat resistance, chemical resistance and electric insulating properties, and therefore has been heretofore widely used as a heating medium for heat treatment, additives for paint, ink and the like, and insulating agents for condensers and transformers.

However, recently, PCB was considered to be an environmental contamination material. However, it is difficult to dispose PCB because of physical and chemical stabilities thereof. Various studies and researches have been made and disclosed to make PCB harmless.

For example, (1) Japanese Patent Laid-Open No. 82,570/1974 publication, Japanese Patent Publication No. 39,290/1981 publication and Japanese Patent Laid Open No. 241,586/1990 disclose a method in which PCB is mixed or not mixed with alkaline metal, hydrogen gas or the like and subjected to thermal decomposition at a high temperature of 1200° C to 1500° C.

(2) Japanese Patent Laid-Open No. 63,005/1975 publication and Japanese Patent Publication No. 59,779/1986 publication disclose a method in which ultraviolet rays are irradiated on a mixture of PCB and hydrogen, a basic material or the like for photo-decomposition.

(3) Japanese Patent Laid-Open No. 205,510/1989 publication discloses a method in which alkaline metal oxide and glycols are added to PCB and subjected to chemical decomposition under the $N_2$ gas atmosphere.

However, the above-described thermal decomposition method has problems in that an extremely high temperature is required, a large amount of energy is required, and polydibenzfuran chloride (PCDF) and dioxine which are much higher in toxicity than PCB are possibly generated due to the lowering of a burning temperature. Further, the photo-decomposition method using ultraviolet rays has a problem in that when only the ultraviolet rays or ultraviolet rays and ozone are merely used, the decomposition rate is low and the efficiency is poor. Moreover, the chemical decomposition method uses various chemicals, and has a problem in that the cost increases, and handling of chemicals is difficult, deteriorating workability.

SUMMARY OF THE INVENTION

The present invention solves the aforementioned conventional problems. An object of the present invention is to provide a decomposition method for a halogenated compound which can extremely efficiently decompose a halogenated compound with a simple equipment and in a short period of time. A further object of the invention is to provide a decomposition apparatus for a halogenated compound which can extremely efficiently decompose a polyhalogenated compound while saving energy and with a simple construction.

For achieving the aforesaid objects, the present invention comprises the following configurations.

The invention of a decomposition method for a halogenated compound according to claim 1 comprises mixing a halogenated compound or a halogenated compound containing solution with an ozone containing fluid and irradiating a ray of light having a wave length of 250 nm to 650 nm under the temperature condition from a normal temperature to 200° C.

According to claim 1, the invention of a decomposition method for a halogenated compound of claim 2 is that said ozone containing fluid is an ozone water or an ozone containing gas.

According to either claim 1 or 2, the invention of a halogenated compound of claim 3 is that said ray of light is a ray of light of which radiant intensity is 0.15 to 90 $\mu w/cm^2$.nm, preferably 0.2 to 80 $\mu w/cm^2$.nm with 50 cm.

According to any of claims 1 to 3, the invention of a decomposition method for a halogenated compound of claim 4 is that 0.001 to a few wt % of a basic solution is mixed into said halogenated compound or a halogenated compound containing solution.

According to any of claims 1 to 4, the invention of a decomposition method of claim 5 is that a mixture of said halogenated compound or said halogenated compound containing solution and said ozone containing fluid is subjected to photo-decomposition under the turbulent flow and/or the emulsified state.

The invention of a decomposition apparatus for a halogenated compound according to claim 6 comprises a light source tube for emitting a ray of light from 250 nm to 650 nm, and a photo-decomposition reaction tube which accommodates said light source tube and irradiates said ray of light on a mixture of a halogenated compound or a halogenated compound containing solution and an ozone containing fluid to effect dehalogenation.

The invention of a decomposition apparatus for a halogenated compound according to claim 7 comprises an inner cylinder for accommodating a light source tube which emits a ray of light from 250 nm to 650 nm, an outer cylinder for substantially coaxially accommodating said inner cylinder, and a raw material supplying portion disposed tangential to one end of said outer cylinder.

Polyhalogenated compounds termed herein include halogenated alkyl, halogenated aryl, halogenated acyl, other chlorinated materials, bromide materials, fluoride materials, etc. Gaseous materials having a low molecular weight and a low halogenation rate and solid materials having a halogenation rate of 55% or more such as polyhalogenated materials may also be included. When materials having a high viscosity are dissolved into a solvent, a large heating equipment or the like is not necessary. Particularly, these can be suitably used for polyhalogenated compounds such as PCB.

Ozone containing fluid termed herein include pure ozone. Ozone containing gas termed herein include pure ozone gas.

In the case where the ozone containing fluid is an ozone containing gas, those having a high concentration exhibits a high decomposition rate and therefore are preferable. Even those having a low concentration can be used by mixing them in a multistage manner.

Although ozone water having a high concentration is preferable but when a reaction system is carried out under a heating state, an ozone containing gas is better.

As a light source, a mercury-xenon lamp, a xenon lamp, a halogen lamp, a ultrahigh voltage mercury lamp or the like are suitably used.

For a basic solution, aqueous solutions such as KOH, NaOH, $NH_4$, OH, etc. as a basic material are suitably used in terms of economy. These may be formed into an aqueous solution or may be dissolved into alcohols such as methanol.

With respect to the decomposition apparatus for a halogenated compound, several apparatuses are arranged in series according to the magnitude of a halogenation rate or properties of gas or liquid, or a recirculation apparatus may be disposed.

With the above described configuration, C-halogen coupling of a polyhalogenated compound is excited to easily carry out de-halogenation. Since ozonide can be decomposed by adding water, decomposition can be made in a safe manner. A dehalogenated halogen ion can be easily captured by adding an basic solution.

As described above, the present invention can realize a decomposition method for a halogenated compound in which a halogenated compound and an ozone are subjected to substantially 100% photo-decomposition at a low temperature and under an emulsified state and which is high in decomposition rate and excellent in energy saving property. The present invention further can realize a decomposition apparatus which is so simple that it can be formed into compact configuration, which can be easily installed on a vehicle or the like, which is excellent in tranportation, workability and operability, which can be directly installed in a PCB storage of factories, and which can make PCB or the like 100% harmless.

DESCRIPTION OF THE PREFERRED EMBODIMENTS

A first embodiment of the present invention will be described hereinbelow with reference to the drawings.

Figure 1:
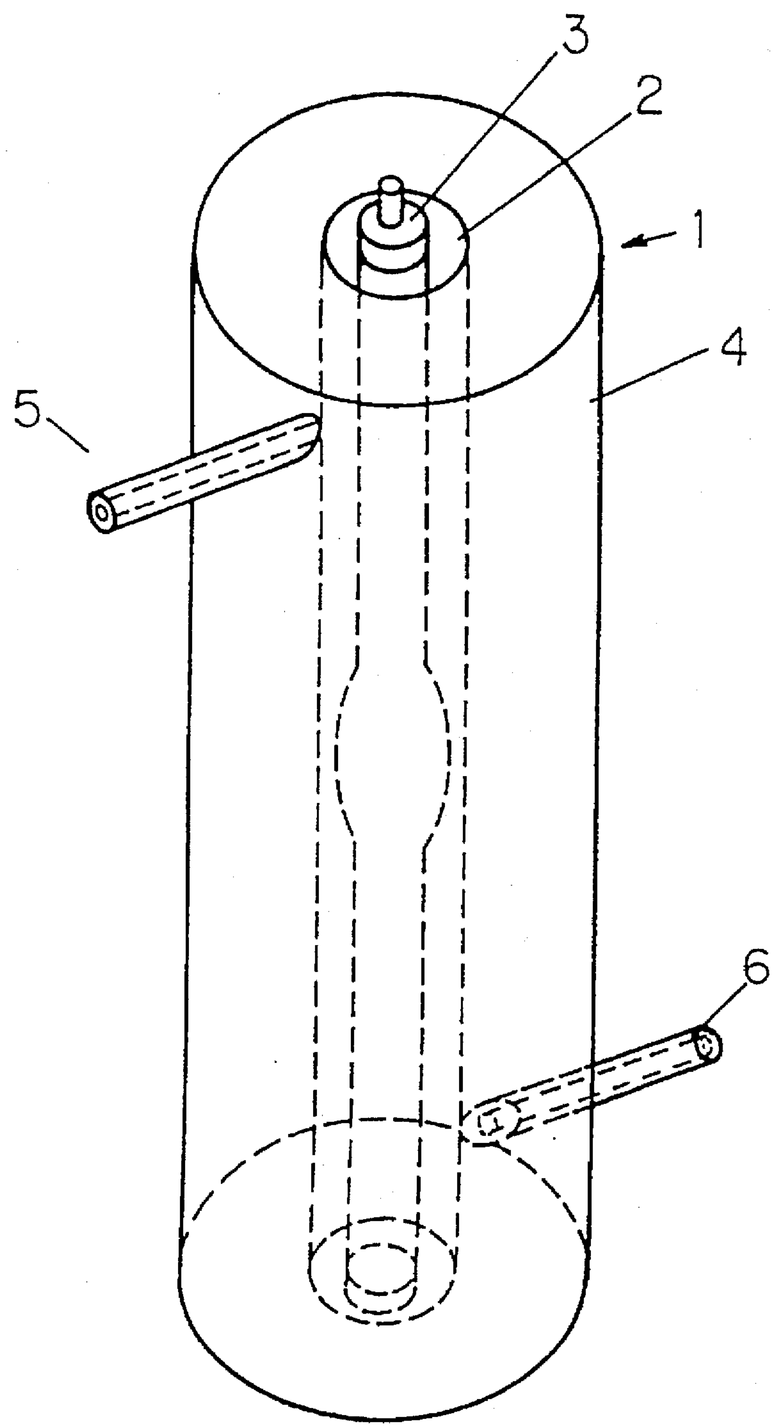
FIG. 1 is a perspective view showing essential parts of a photo-decomposition reaction tube according to an embodiment.
Figure 2:
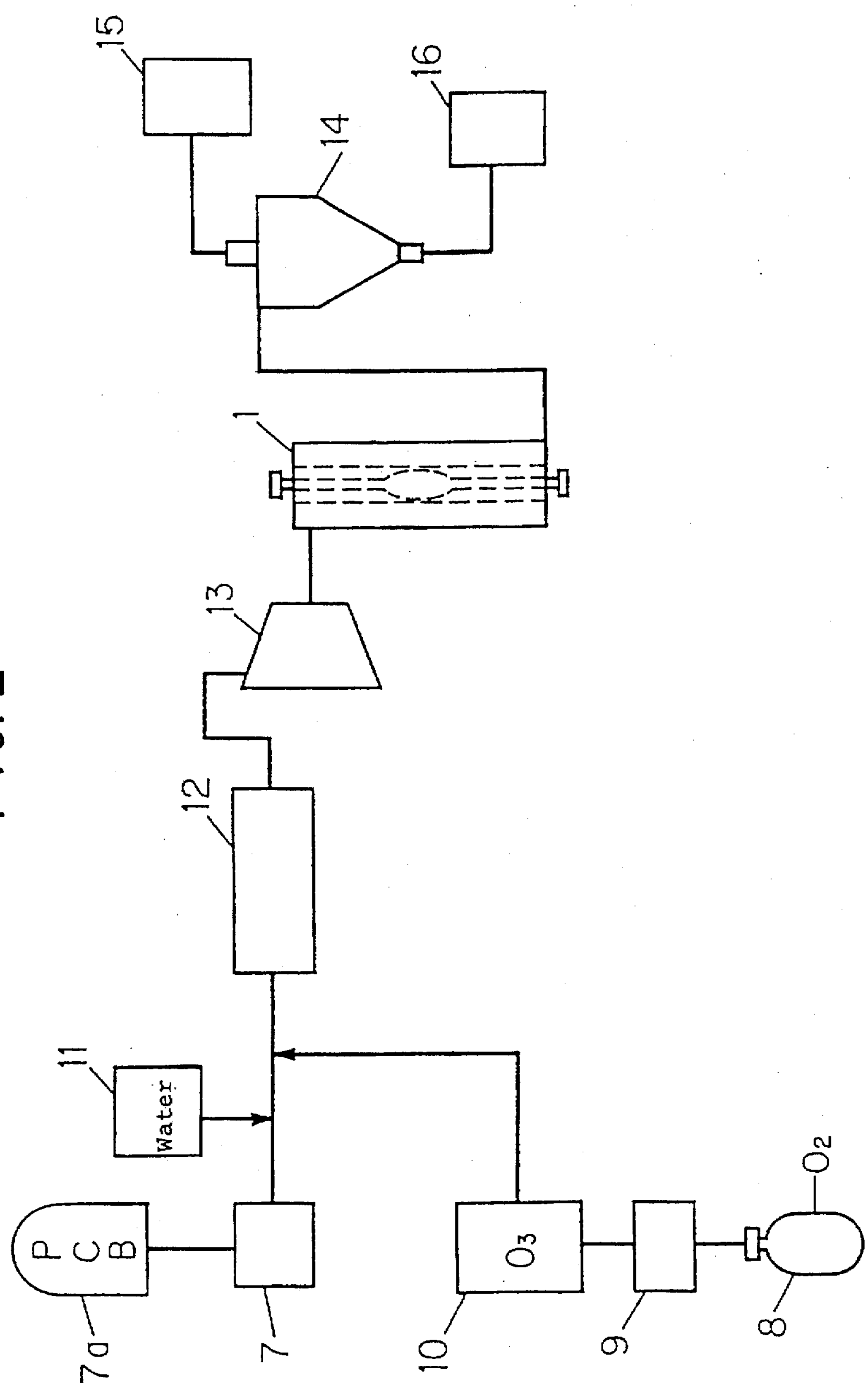
FIG. 2 is a flow chart of a decomposition apparatus for a polyhalogenated compound according to an embodiment.
Figure 3:
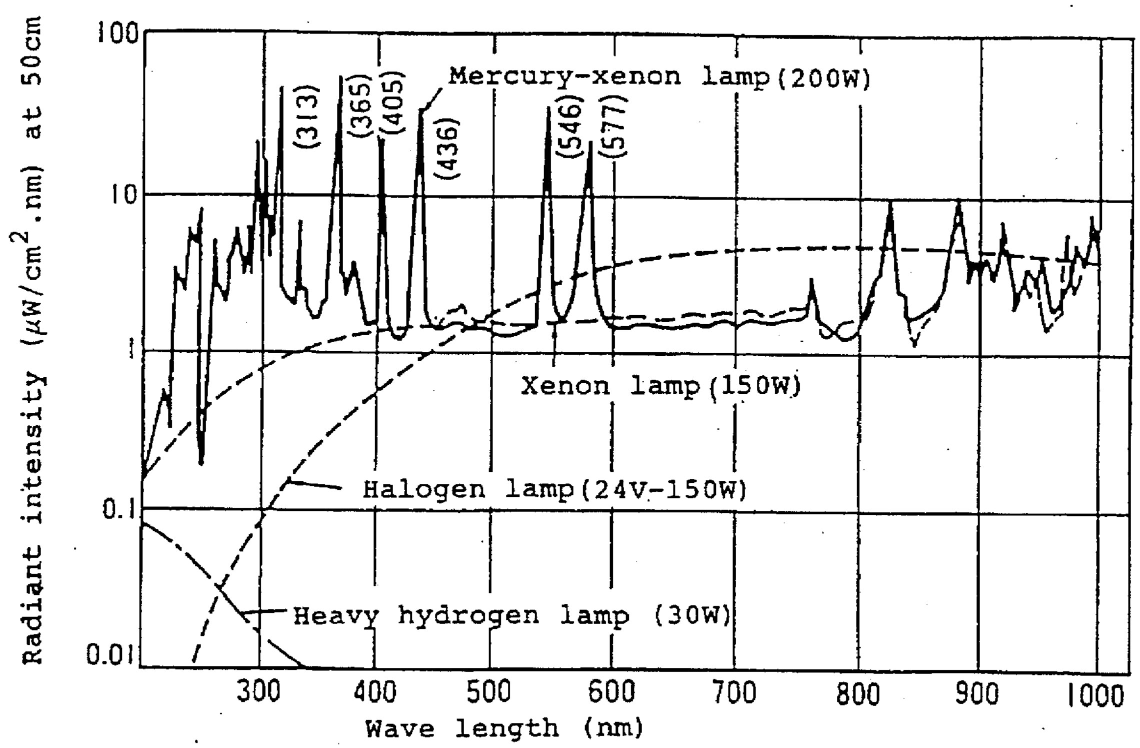
FIG. 3 shows the relationship between a radiant intensity of a light source and a wavelength.

FIG. 1 is a perspective view of a photo-decomposition reaction tube according to an embodiment, FIG. 2 is a flow chart of a decomposition apparatus, and FIG. 3 shows the relationship between a radiant intendisty of various light sources and a wavelength.

Reference numeral 1 denotes a photo-decomposition reaction tube, 2 denotes an inner cylinder formed from glass or the like which is light transmissible and has an alkaline resistance, 3 denotes a mercury-xenon lamp as a light source, 4 denotes an outer cylinder formed from glass or metal plate, 5 denotes a raw material supplying portion disposed tangential to the outer cylinder 5 on the end of the photo-decomposition reaction tube 1, and 6 denotes a reaction liquid outlet portion disposed tangential to the outer cylinder 4 on the other of the photo-decomposition reaction tube 1.

In FIG. 2, reference numeral 7 denotes a quantitative supplying machine for flowing a predetermined quantity of a polyhalogen compound containing solution from a tank 7*a* for an organic solvent in which a polyhalogenated compound such as PCB is dissolved, 8 denotes an oxygen bomb, 9 denotes an ozone producing machine for producing ozone from oxygen in an oxygen bomb 8, 10 denotes an ozone straightening machine for flowing a predetermined quantity of ozone, 11 denotes a quantitative supplying machine for supplying water or lean NaOH and KOH solutions, 12 a heater enclosing therein a far infrared heater or the like, 13 denotes a mixer for mixing a polyhalogenated compound such as PCB, ozone and water into an emulsified state, 14 denotes a liquid cyclon for separating a reacted product into a sludge and an oily material, 15 denotes an oily material storage, and 16 denotes a sludge storage.

A decomposition method for a polyhalogenated compound using a polyhalogenation and decomposition apparatus according to the present embodiment constructed as described above will be described hereinbelow.

Flow rates of dark reddish brown transformer oil (PCB content: 3.5 mg/liter) containing PCB, ozone gas(ozone concentration: substantially 60000 ppm) and water are respectively set to 50 liter/Hr, 50 liter/min and 1 liter/Hr. These are heated to approximately 50° by the heater 12 while mixing them. Then, a polyhalogenated compound containing solution, a fine quantity of water and ozone are mixed by the mixer 13 in which two rotary members with wire brushes closed mounted thereon are rotated in a direction opposite to each other to form an emulsified material to form an emulsified liquid. Subsequently, the emulsified liquid is supplied from the raw material supplying portion 5 at a flow velocity of $5\times10^6$ to $6\times10^6$ liter/m$^2$ Hr. Rays of light having 0.2 to 80 μW/cm$^2$.nm(at 50 cm) and 300 to 600 nm of wavelength were irradiated by the mercury-xenon lamp or the xenon lamp 3 while whirling the emulsified liquid within the photo-decomposition tube 1. Since the polyhalogenated compound containing solution and ozone are materially widened in their contact areas in the emulsified state, the ozone is quickly reacted with PCB by the rays of light, and a tar-like reaction product appears on the outer wall portion. However, a reaction liquid is discharged out of the reaction liqiud outlet portion 6 without being adhered to the outer wall since it violently whirls. The discharged reaction liquid is separated by the liquid cyclon into a brown and substantially transparent organic solvent layer and a black tar-like sludge. The organic solvent layer and the tar-like sludge are stored into the oily material storage 15 and the sludge storage 16, respectively. The product ratio of the organic solvent layer to the sludge was 90 to 96:10 to 4.

Next, the content rate of PCB with respect to the organic solvent layer was measured. The measurement was conducted in accordance with JIS-K-0120 27. The result is given in Table 1 below.

TABLE 1

| Example | PCB (mg/l) |
|---|---|
| Before decomposition | 3.5 |
| After decomposition | 0.0005> |
| Decomposition method: JIS-K-0120 27 | |

As will be apparent from the above Table 1, in the present example, with respect to the raw material of which PCB content is 3.5 mg/liter, the PCB content after decomposition was decomposed to 0.0005 mg/liter or less by the present example. It is understood from this that PCB in the PCB containing organic solvent was decomposed to 1/7000 but the decomposition rate was 99.999% or more.

In the present example, the flow rate of the PCB containing solution to the ozone was approximately 1:1 but it may be suitably adjusted according to the chlorinated degree of PCB. The temperature of the heater depends on pressure of a mixture but when heated, the reaction rate can be materially enhanced. According to the qualitative experiment conducted at 80° C., there appeared a precipitation of a black tar-like material as a decomposition material in an extremely early stage in the photo-deposition reaction tube. In the case where the reaction system is pressure resistant, it can be heated to a high temperature. An aqueous solution need not be mixed but in the case where an ozonide of a halogenated compound tends to form a peroxide, it is safe to mix a stoichiometric amount of ozonide decomposition agent. In the case where a far infrared ray is used as a heating source for a heater, water in a reaction liquid is formed into an internal heating medium, and therefore, when a small amount thereof is added, energy can be saved. A small amount of aquous solution such as KOE and NaOH is advantageously added to a water solution because it acts as a halogen supplementary agent depending on the kind of halogenated compounds. However, in the case where the inner cylinder of the photodecomposition reaction tube is made of glass, a lean concentration to the extent that glass is not corroded is preferred.

In the mixer 13, ozone may be dispersed into the halogen containing solution using supersonic waves, in addition to mechanical emulsification. When the emulsified state is obtained by supersonic waves, the emulsified state can be preferably maintained for a long period of time depending on the viscosity of the PCB solution. It is to be noted that a small amount of emulsifier may be mixed into the system.

In the photo-decomposition reaction tube, in addition to flow a reaction liquid at a high-speed whirling flow, an ozone flow and a solution flow of halogenated compound may be created under a high pressure jet flow as far as a tar component is prevented from sticking to the wall of the photo-decomposition reaction tube.

In addition to the coaxial type of the photo-decomposition reaction tube according to the present embodiment, a mixture of a halogenated compound and an ozone may be irradiated with rays of light under tubulent flow or suspension state. For example, rays of light may be irradiated on the cyclone type photo-decomposition reaction tube from the cylindrical side wall thereof for decomposition. Furthermore, if a few photo-decomposition reaction tubes are arranged in series or a recirculation system is added for photo-decomposition, a halogenated compound having a high chlorination rate can be easily decomposed.

While as separation means for separating a reaction liquid from a sludge, a liquid cyclone has been used, it is to be noted that a decanter such as a centrifugal separator or a precipitator conventionally used may be used depending on the kind, concentration or viscosity of a halogenated compound solution.

We claim:

1. A decomposition system for a halogenated compound comprising a light source for emitting light in the range of 250 nm to 650 nm, a light source tube having an inner cylinder containing such light source, a photo-decomposition reaction tube including an outer cylinder housing said light source tube coaxially and defining a dehalogenation chamber between said outer cylinder and said light source tube and including a raw material inlet to said chamber disposed tangentially to said outer cylinder, a source of ozone, a source of basic aqueous liquid, a mixer connected to receive ozone from said source of ozone and to receive basic aqueous liquid from said source of basic aqueos liquid, said mixer comprising means for mixing a solution containing halogenated compound with ozone from said source of ozone and basic aqueous liquid from said source of basic aqueous liquid into an emulsion, and means for supplying the emulsion to said raw material inlet to said chamber.

* * * * *